Figure 1A:
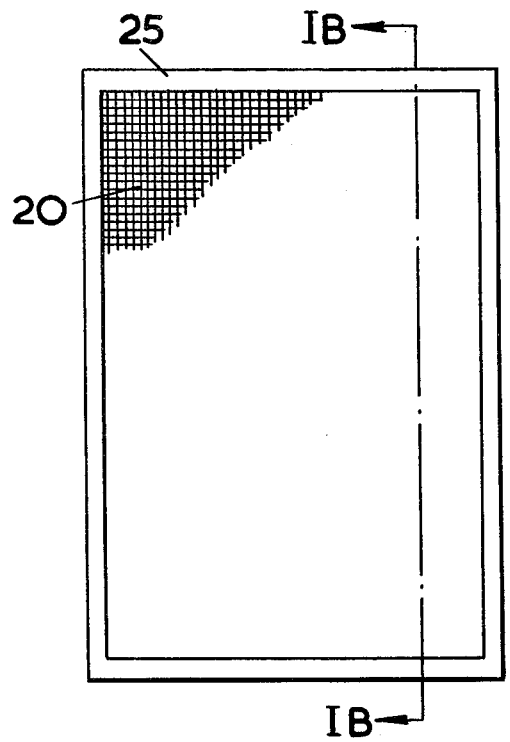

United States Patent [19]

Clapham et al.

[11] 4,006,730
[45] Feb. 8, 1977

[54] APPARATUS FOR STORING ENERGY FROM ELECTROMAGNETIC RADIATION

[75] Inventors: Peter Brian Clapham, Chertsey; Michael Christopher Hutley, Hanworth, both of England

[73] Assignee: The Secretary of State for Industry in Her Britannic Majesty's Government of the United Kingdom of Great Britain and Northern Ireland, London, England

[22] Filed: Feb. 26, 1975

[21] Appl. No.: 553,407

[30] Foreign Application Priority Data

Feb. 28, 1974    United Kingdom ............... 9235/74

[52] U.S. Cl. .................................. 126/271; 350/1
[51] Int. Cl.² ........................................... F24J 3/02
[58] Field of Search ................. 126/270, 400, 271; 237/1 A; 350/1; 117/33.3; 96/38.3; 60/641

[56]            References Cited
          UNITED STATES PATENTS

| | | | |
|---|---|---|---|
| 1,722,368 | 7/1929 | Comstock | 96/38.3 |
| 3,000,375 | 9/1961 | Golay | 126/270 |
| 3,173,801 | 3/1965 | Lipkis et al. | 126/270 |
| 3,176,679 | 4/1965 | Langley | 126/270 |
| 3,272,986 | 9/1966 | Schmidt | 126/270 |

FOREIGN PATENTS OR APPLICATIONS

| | | | |
|---|---|---|---|
| 938,012 | 9/1963 | United Kingdom | 126/271 |
| 282,819 | 8/1965 | U.S.S.R. | 126/271 |

*Primary Examiner*—Kenneth W. Sprague
*Assistant Examiner*—James C. Yeung
*Attorney, Agent, or Firm*—Pollock, Vande Sande and Priddy

[57]            ABSTRACT

Apparatus, for storing energy from incident electromagnetic radiation, having an electromagnetic radiation energy absorbing means; an optical reflection filter having a substantially greater reflectance of electromagnetic radiation of longer than of shorter wavelengths and a substantially greater transmission for electromagnetic radiation of visible and shorter wavelengths than it has for electromagnetic radiation of wavelengths greater than those of the visible spectrum, the filter being positioned relative to the said energy absorbing means so that incident electromagnetic radiation can pass through the filter to reach the absorbing means, but energy re-emitted by the absorbing means in the direction of the filter is substantially returned by the filter to the absorbing means; an output channel for drawing off energy from the energy absorbing means; and means for restricting the outflow of energy otherwise from the energy absorbing means.

7 Claims, 6 Drawing Figures

APPARATUS FOR STORING ENERGY FROM ELECTROMAGNETIC RADIATION

This invention relates to apparatus for storing energy from electromagnetic radiation (hereinafter referred to for brevity as emr), more especially, but not exclusively, emr from the Sun.

Energy carried by emr falls upon the Earth from the Sun, a great part of it in the form of visible radiation. The Earth although at a much lower temperature than the Sun radiates in turn, but in the infra-red part of the spectrum, centered at about 10 $\mu$m ($\mu$m = micrometer). Equilibrium is established between energy received and energy radiated and this limits the temperature of the surface of the Earth.

Many attempts have been made to utilize solar energy, some of them successful, making use of the greenhouse effect in which an energy absorbing means, such as a black body, is placed in a transparent enclosure, eg of glass, through which it receives emr from the Sun. The glass transmits the visible radiation to the absorbing means which absorbs it and emits infra-red radiation. This infra-red radiation is absorbed by the glass which is thereby heated so that it in turn, having appreciable emissivity, emits infra-red radiation, part of which is returned to the black body and the rest is emitted into space and represents a loss of energy.

The present invention provides means by which the loss of energy from the storage means by re-radiation is made small or very small.

According to the invention, apparatus for storing energy from incident emr from solar or an equivalent prime source of emr has an emr energy absorbing means; an optical reflection filter having a substantially greater reflectance of emr of longer than of shorter wavelengths and a substantially greater transmission for emr of visible and shorter wavelengths than it has for emr of wavelengths greater than those of the visible spectrum, the filter being positioned relative to the said energy absorbing means so that incident emr can pass through the filter to reach the absorbing means but energy re-emitted by the absorbing means in the direction of the optical reflection filter is substantially returned by the filter to the absorbing means; an output channel for drawing off energy from the energy absorbing means; and means for restricting the outflow of energy otherwise from the energy absorbing means.

In one form of the invention the optical reflection filter comprises a mesh of electrical conductors spaced so that the mesh transmits emr of visible and shorter wavelengths and reflects a substantial proportion of emr of wavelengths longer than visible. The mesh may comprise two gratings superimposed substantially at right angles, each grating being metallized along each line thereof to form a succession of discrete electrical conductors substantially parallel with one another. The gratings are preferably blazed gratings and the spacing between conductors in the plane of the mesh is desirably in the range 2 to 3 $\mu$m. Desirably each line of one grating is in electrical contact with substantially all the lines of the other grating.

In a second form of the invention the optical reflection filter is arranged on the absorbing means as a substrate, which substrate absorbs emr of visible and shorter wavelengths, the optical reflection filter being a regular array of small protuberances of the kind described in our copending U.S. Pat. application Ser. No. 467,354, filed May 6, 1974, for "Improvements in Reducing The Reflectance of Surfaces to Radiation" now abandoned and replaced by continuation application Ser. No. 656,757 filed Feb. 9, 1976, the subject matter of which is incorporated herein by reference.

The substrate with protuberances is preferably coated with a thin layer of reflecting metal, desirably gold.

The spacing of the protuberances should be less than the smallest wavelength of visible emr and the height of the protuberances not less than about one third of the longest wavelength of visible emr; the spacing should be of the order of 250 nm, and not greater than about 300 nm.

In one embodiment the substrate is a plastics material on which the protuberances have been formed by embossing, which may be carried out with a roller in a continuous process.

Preferably the means for restricting the outflow of energy from the energy absorbing means, otherwise than through the output channel, is lagging in the form, for example, of glass- or mineral-wool or a vacuum jacket, or a combination of such means.

Figure 1B:
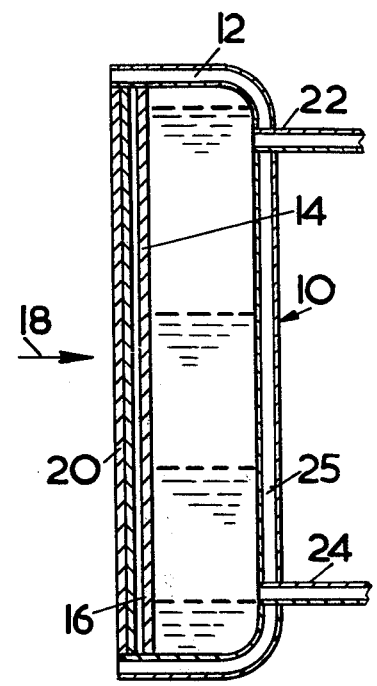
Figure 2A:
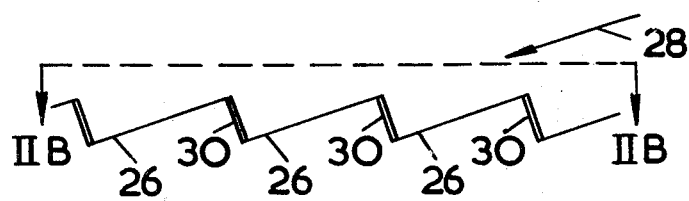
Figure 2B:
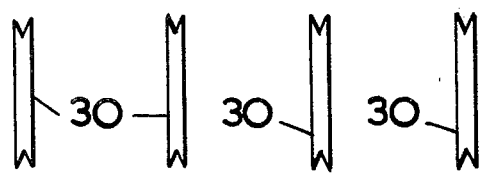
Figure 3:
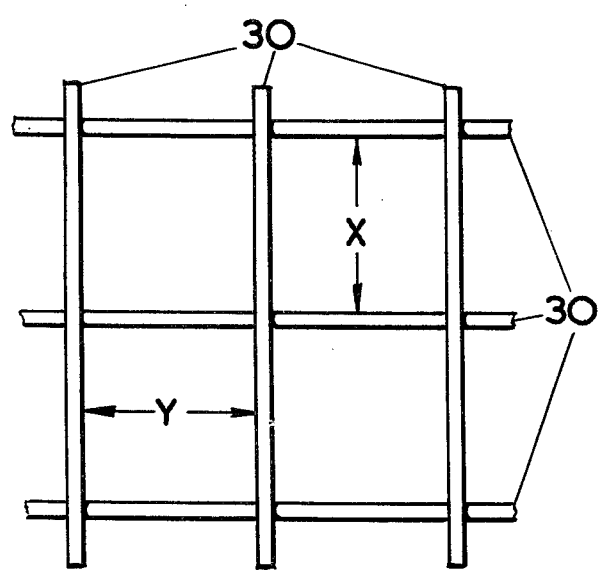
Figure 4:
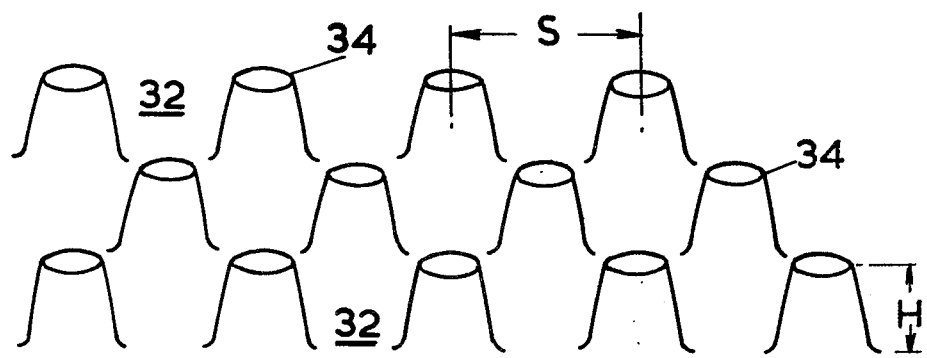

The invention will be further described, by way of example only, with reference to the drawings filed herewith in which FIG. 1A is a front elevation of an apparatus according to the invention, FIG. 1B is a sectional side elevation on the line B—B in FIG. 1A, FIG. 2A is an enlarged end view of part of a blazed ruled grating metallized along each ruling for use in an apparatus of the type shown in FIG. 1, FIG. 2B is a part plan on the line B—B in FIG. 2A, FIG. 3 is an enlarged plan of part of a mesh optical reflection filter for use in the apparatus of FIG. 1 employing gratings of the type shown in FIGS. 2A and 2B, and FIG. 4 is an enlarged plan of a different form of optical reflection filter of the "moth eye" kind for use in an apparatus of the type shown in FIG. 1.

FIGS. 1A and 1B represent an apparatus for storing energy from emr; the energy absorbing means is indicated generally by reference 10, which in this embodiment is a hollow container 12. One side 14 of the container is black on its outer face 16 so that it can absorb a very high proportion - approaching 100 percent - of any visible and infrared emr reaching it, such emr being indicated diagrammatically by the arrow 18. Between the source of emr and the radiation - absorbing surface 16 is arranged an optical reflection filter 20. The optical reflection filter is so constructed, as will be described below, that it allows visible and shorter wavelength emr to pass through from the source, eg the Sun, to reach the energy storage means 10 and be absorbed by the surface 16 thereof. The construction of the optical reflection filter 20 also gives it the property of reflecting infra-red radiation, ie wavelength longer than the visible. The optical reflection filter may be compared very loosely to a sieve which passes small particles (short wavelengths) but rejects large particles (long wavelengths). The radiation passing through the filter raises the temperature of the energy absorbing means which radiates back infra-red radiation, but this is reflected back virtually completely to the energy absorbing means by the filter. Since the filter, unlike the glass of a greenhouse, does not absorb the infra-red radiation its temperature is not thereby raised and it does not radiate any energy away to space. The energy saved from being radiated away serves to raise the energy absorbing means to a higher temperature than it would have reached with the same incident radiation but without the optical reflection filter. If the energy absorbing means could be completely isolated except from the incident radiation it would rise to a temperature at which the radiation from it was of sufficiently short wavelength to be transmitted by the optical reflection filter. In practice this does not happen because the temperature is limited by conduction and convection effects and because the optical reflection filter, although it can be highly efficient, is not perfect.

In the embodiment illustrated, the energy absorbing means being formed as a hollow container, a liquid such as water may be circulated therethrough by means of the pipes 22, 24 constituting an output channel. In this way energy can be drawn off by heating the water in the container from the absorbed radiation, the energy then being applicable, for example, to domestic or other heating purposes. Reference 25 indicates lagging, which may for example be glass wool, or could be a vacuum jacket or a combination of the two.

One form of optical reflection filter 20 which can be used in the present invention is a fine mesh of electrical conductors, as illustrated to a greatly enlarged scale in FIG. 3. The mesh may consist of two superimposed arrays each of parallel equally spaced conductors, the arrays being arranged at right angles to one another. Each array may be made from a grating, such as a diffraction grating, on transparent material and metallized along the raised lines of the grating by vacuum evaporation.

It is possible to use either a ruled or an interference grating, but in either case better defined conductors can be obtained if the grating is of the blazed kind.

A greatly enlarged cross section of a blazed grating is illustrated in FIG. 2A. This is a grating in which the raised lines 26 are asymmetric in cross section, one side being much steeper than the other in relation to the general plane of the grating. If such a grating is metallized by directing a stream of metal vapor substantially in the direction of the arrow 28, sharply defined, narrow conductors 30 are produced, as indicated also in FIGS. 2B and 3.

For convenience and to reduce cost, the gratings used may be plastics resin replicas of an original ruled glass grating (or interference grating).

Two gratings may be superimposed, as shown in FIG. 3, with the conductors in one adjacent those in the other. In an alternative construction a first replica grating is formed on a transparent base and is metallized. A thin layer of plastics resin is laid down on the first replica and a second replica grating formed in said layer at right angles to the first replica grating and also metallized to form an inseparable mesh. However, it has been found that radiation passing one of the gratings can be absorbed by the plastics resin layer before being reflected by the other grating. The resin layer then rises in temperature and re-radiates with consequent loss of energy. This effect can be minimized by making the plastics resin layer as thin as is practicable. Ideally the two metallized gratings are in direct contact and this may be achieved in effect by contact printing an image of a mesh, the mesh having been made by a method such as already described above, onto a layer of photoresist. The image can then be turned into an electrically conducting mesh by conventional developing and etching processes.

The mesh is desirably constructed so that the dimensions X, Y in FIG. 3 are equal and in the range of about 2 to about 3 μm, although a small inequality can be tolerated.

Large areas of replica grating must in general be built up piece by piece using a relatively small area of original grating; however, it is not essential that adjacent pieces of replica should be optically coherent.

In another embodiment of the invention the optical reflection filter comprises a substrate, opaque at least to visible radiation, on which is arranged a regular array of small protuberances, desirably conical or frusto-conical or pyramidal in form, tapering away from the substrate as shown diagrammatically in FIG. 4, the substrate being referenced 32 and the protuberances 34. The spacing S of the protuberances is less than the smallest wavelength of visible emr, and the height H is not less than about one third of the longest wavelength of visible emr. This arrangement of protuberances provides a gradual change of refractive index across the interface between the substrate and adjacent medium with the consequence that surface reflections are markedly reduced. Methods for producing such protuberances are set forth in the aforementioned copending U.S. Patent application Ser. No. 656,757.

If a surface having such protuberances thereon is coated with a metal film, preferably gold, the reflectivity of the surface is reduced as compared with a flat metal surface, for visible wavelengths. However, for emr of much longer wavelength, such as infra-red, the height of the protuberances is small compared with the wavelength. Hence the surface, especially when coated with gold, coacts with the long wavelength emr as though the surface were a sharply defined boundary between two optical media with a very sudden change of refractive index. The reflectivity to such long wavelengths is therefore high. If the reflectivity of a surface is high it follows that the emissivity is low. That is to say that a highly reflecting surface can reach a much higher temperature than an absorbing surface without radiating much energy. The spacing S, of the protuberances should not be greater than about 250 nm and the height H not less than about 230 nm. A surface provided with such protuberances and coated with a gold film reflects about 97% of incident infra-red radiation and only 2 to 3% of visible radiation. Here the optical reflection filter is integral with the energy absorbing means, and will reach an enhanced temperature for given incident radiation, because the re-radiation of infra-red emr is substantially reduced on account of the low emissivity.

To make an optical reflection filter, of the kind illustrated in FIG. 4, on a commercial scale, a few square inches of surface with protuberances (which has been called a "moth eye" surface) is first made by the methods of the aforementioned copending U.S. Pat. application Ser. No. 656,757, as a "master" surface, eg by ion etching into glass. From this a replica is made in plastics resin by casting or in metal by electroforming, to give two examples of method. Copies can be made by further casting from the resin replica; or the hard metal replica can be used to emboss copies on plastics material. It is possible to make a hard metal replica in the form of a roller so that large area copies of the pattern on the "master" surface can be produced on eg a plastics surface by a continuous process.

As in the case of the conducting mesh type of optical reflection filter, when a large area of "moth eye" filter is made up from smaller sections it is not essential that adjacent sections should be optically coherent.

We claim:

1. Apparatus, for storing energy from incident electromagnetic radiation, having a radiation energy absorbing means; an optical reflection filter which has a regular array of protuberances, the spacing of said protuberances being less than the smallest wavelength of visible radiation and the height of said protuberances being no less than one-third of the longest wavelength of visible radiation, the filter being positioned relative to the said energy absorbing means so that incident electromagnetic radiation can pass through the filter to reach the absorbing means, but energy reemitted by the absorbing means in the direction of the filter is substantially returned by the filter to the absorbing means; an output channel for drawing off energy from the energy absorbing means; and means for restricting the outflow of energy otherwise from the energy absorbing means.

2. Apparatus according to claim 1 in which the optical reflection filter is arranged on said absorbing means as a substrate having said protuberances thereon, said substrate and protuberances being coated with a thin layer of reflecting metal.

3. Apparatus according to claim 2 in which the metal is gold.

4. Apparatus according to claim 1 in which the spacing of the protuberances is not greater than about 300 nm.

5. Apparatus according to claim 1 in which the spacing of the protuberances is not greater than about 250 nm.

6. Apparatus according to claim 1 in which the optical reflection filter is arranged on said absorbing means as a substrate, said substrate constituting a plastics material on which the protuberances have been formed by embossing.

7. Apparatus according to claim 6 in which the protuberances have been formed by embossing with a roller.

* * * * *

UNITED STATES PATENT AND TRADEMARK OFFICE
CERTIFICATE OF CORRECTION

PATENT NO. : 4,006,730

DATED : February 8, 1977

INVENTOR(S) : Peter Brian Clapham and Michael Christopher Hutley

It is certified that error appears in the above-identified patent and that said Letters Patent are hereby corrected as shown below:

Column 4 line 12 change "opaque" to -- transparent --

Signed and Sealed this

Thirty-first Day of May 1977

[SEAL]

Attest:

RUTH C. MASON
*Attesting Officer*

C. MARSHALL DANN
*Commissioner of Patents and Trademarks*